May 19, 1964  M. F. PETERS  3,133,754
FLEXIBLE ASSEMBLIES FOR FLUID BEARING LINES
Filed Jan. 27, 1959  5 Sheets-Sheet 1

INVENTOR.
Melville F. Peters
BY
ATTORNEY

May 19, 1964  M. F. PETERS  3,133,754
FLEXIBLE ASSEMBLIES FOR FLUID BEARING LINES
Filed Jan. 27, 1959  5 Sheets-Sheet 2

INVENTOR.
Melville F. Peters
BY
ATTORNEY

May 19, 1964 M. F. PETERS 3,133,754
FLEXIBLE ASSEMBLIES FOR FLUID BEARING LINES
Filed Jan. 27, 1959 5 Sheets-Sheet 4

INVENTOR.
Melville F. Peters
BY
ATTORNEY

United States Patent Office 3,133,754
Patented May 19, 1964

3,133,754
FLEXIBLE ASSEMBLIES FOR FLUID
BEARING LINES
Melville F. Peters, 29 N. Ridge Road, Livingston, N.J.,
assignor of fifty percent to Joseph J. Mascuch, Millburn, N.J.
Filed Jan. 27, 1959, Ser. No. 789,384
10 Claims. (Cl. 285—165)

This invention relates to flexible assemblies for use in connection with fluid bearing lines and particularly lines which are connected to units which operate at high temperatures and pressures and which may move with respect to each other.

Where conduits are used to conduct fluids between boilers and turbines, or between pumps and actuators, it is necessary to use flexible seals between the vibrating and non-vibrating units to prevent the stresses in the conduits and units from exceeding the elastic limit of the materials in the complete system. In naval vessels it is necessary to provide a flexible assembly which is large and strong enough to absorb the vibrations which take place in the assembly and to withstand the forces developed by shock during beach landings and under water explosions.

The most suitable flexible seal for high temperature, high pressure operations is the metal bellows. Since the shock waves are generally large and exist for a sufficient length of time to rapidly accelerate or decelerate the ship, it is necessary to provide a bellows which has a large working stroke. The permissible working stroke of a bellows is proportional to its length and increases as the thickness of the plates are decreased.

Since room is limited in naval installations, it is necessary to obtain the necessary bellows displacements by making the plates of relatively thin material and consequently the bellows will fail if subjected to relatively weak rotational forces acting about its longitudinal axis. To prevent these rotating forces as well as other forces which are developed in the system from rupturing the thin plates in the bellows, it is necessary to use a flexible assembly and to use the bellows in the assembly as a thin membrane or skin to confine the fluid. The flexible assembly must also translate rotary movements imposed upon the bellows into permitted rectilinear movements. The flexible assembly must provide for pressurizing the bellows externally, so that when the bellows is bowed, the fluid forces acting on the bellows will act to straighten the flexible conduit assembly with respect to the bellows. The flexible assembly must also limit the elongation of the flexible assembly by acting on the compressed bellows, to eliminate the expansive forces developed at the elbows or T's. These expansive forces are of the order of many tons in systems using large diameter pipes and conducting the fluids at high pressures, and in the smaller ships, it is not practical to limit the movement of the elbows and the T's by anchoring them to the ship's structure. The stresses in the relatively weak bellows are kept below the elastic limit of the material during the acceleration of the flexible assembly in one direction by maintaining the bellows in a nested position and by using the high pressure fluid in the system to accelerate the flexible assembly when the bellows is in the elongated position.

The flexible assembly must be provided with a safety device when conducting steam to guard against the loss of life and the destruction of property. In most installations it is necessary to use a safety device which will allow the flexible assembly to operate until repairs can be made. Since the flexible assembly must permit all the movements induced by the exciting forces, it is necessary to use hangers for holding the structure in place which nuetralize the gravitational forces without limiting the rectilinear and rotary motions of the assembly.

Since bellows can execute certain movements without producing highly stressed areas and will develop highly stressed areas when executing other movements, it is an object of the invention to have a flexible assembly which is responsive to all the movements initiated into the ends of the flexible assembly and to have the structure limit the movements transmitted to the bellows to the movements which the bellows can make without developing highly stressed areas.

Accordingly, it is an object of the present invention to provide a flexible assembly for a fluid line which will permit rotation of the line about the axis of the system without bellows failure.

A further object of the invention is to allow the flexible assembly to simultaneously execute rectilinear and rotational movements.

Another object of the present invention is to provide a flexible assembly in which the conduit can rotate without imposing rotational forces upon the bellows structure.

A further object of the present invention is to incorporate nesting type bellows assemblies within a flexible structure so that the bellows will collapse or nest in the presence of excessive pressures and thereby avoid bellows destruction.

Another object of the invention is to reduce the shearing forces in the bellows by securing one end of the bellows in a plane passing through the center of rotation and making the radius of the rotating element equal to the length of the bellows.

Still another object of the present invention is to provide a flexible assembly wherein the flexible bellows elements are pressurized externally to prevent bellows failure.

A further object of the invention is to replace portions of the metal assembly with elastomers to introduce sound attenuating properties into the structures.

A feature of the present invention is its use of two bellows within a flexible system to achieve rotation about the axis of the said system.

Another feature of the present invention is its use of bellows supporting structures which are capable of rotational movements within prescribed limits.

Still another feature of the present invention is its use of sealed chambers within the flexible assembly to protect the fluid bearing system from bellows failure.

A feature of the present invention is its use of a hangar member for supporting that portion of the conduit which is subject to excessive rotational movements.

The invention consists of the construction, combination, arrangement of parts herein illustrated, described and claimed.

In the accompanying drawings, forming part hereof, is illustrated several forms of the invention, in which drawings similar reference characters designate corresponding parts and in which.

Figures 1, 2, 3:
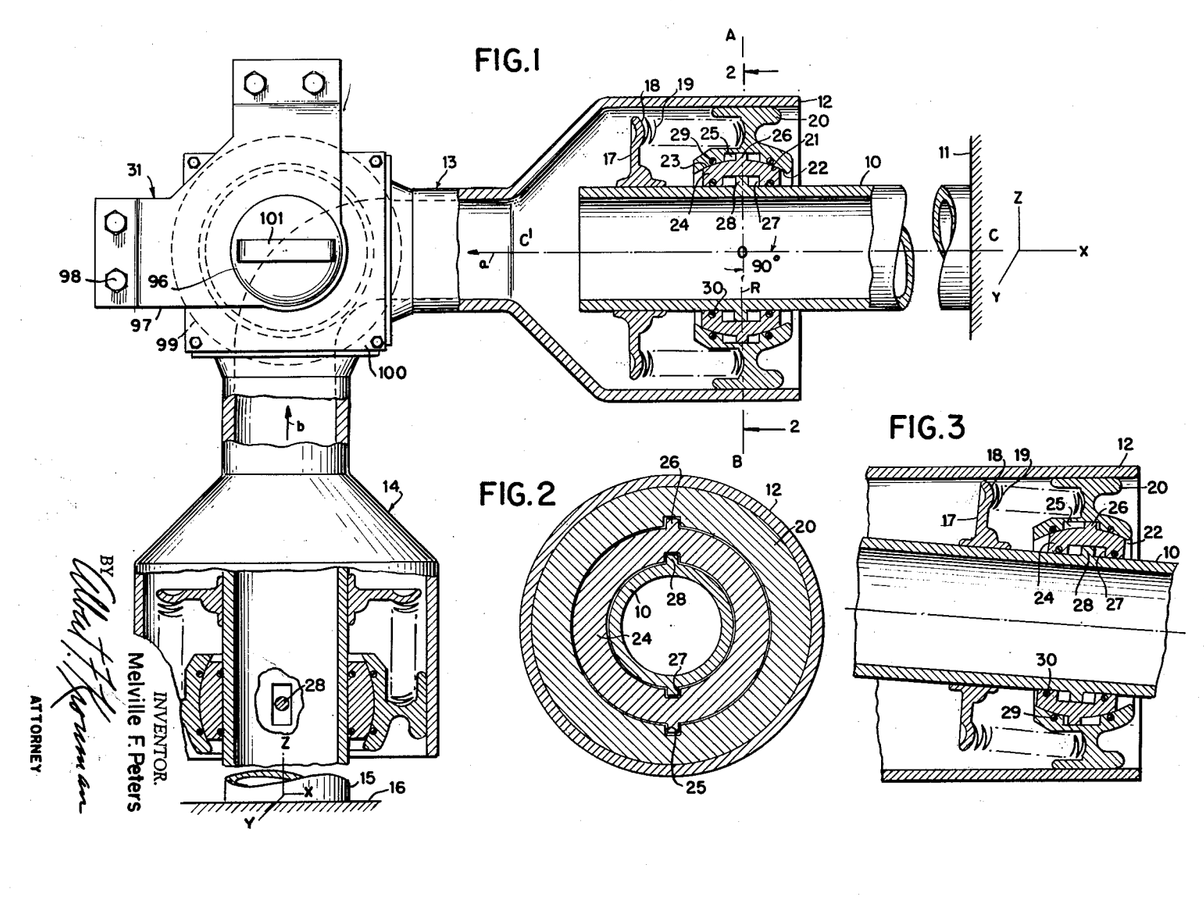
FIGURE 1 is a view in longitudinal section, partly broken away, of a complete embodiment of a flexible fluid conducting assembly according to the present invention.
FIGURE 2 is a view in cross section taken on line 2—2 in FIGURE 1, looking in the direction of the arrows.
FIGURE 3 is a fragmentary view in longitudinal section similar to FIGURE 1, showing the flexible coupling in a displaced position.

Referring to the drawings and specifically to FIGURE 1, 10 indicates a conduit secured to a boiler 11 or some other fluid source. The end of the conduit 10 extends into an enlarged housing member 12. The housing 12 is secured to one end of an elbow shaped member 13, which in turn is attached to a second enlarged housing 14 at the opposite end thereof. The second housing 14 overlies a second conduit 15 which may be connected to a turbine 16 or some other element within the fluid system.

An end flange 17 is welded to the outside of the conduit 10 and extends outwardly thereof into the housing 12. A bellows receiving seat 18 is provided on the end flange 17 and a metal bellows 19 is welded at one end to the seat 18.

The metal bellows is formed of a plurality of thin metal plates each having a central opening therein, welded together at their inner and outer peripheries in alternate arrangement to form the said bellows.

A second end flange 20 is welded to the outer end of the bellows 19. The second end flange 20 is also welded to the inside of the housing 12. The bellows 19 is secured to the end flanges 17, 20 at a point which is the average of the inside and outside diameters of the bellows. Both end flanges are provided with seats which exactly conform to the shape of the bellows plates.

In addition to forming a flexible connection between the conduit 10 and the housing 12, the metal bellows 19 also serves as a seal between the two elements.

The end flange 20 is centrally bored and provided with an enlarged spherical bearing surface 21 on the said bore 22. The spherical bearing surface 21 mates with the spherical bearing surface 23 of a sealing ring 24 which is carried upon the conduit 10 beneath the end flange 20.

The end flange 20 is slotted as indicated at 25, in FIGURES 1, 2 and 3, to receive cylindrical pins 26 which extend outwardly from the sealing rings 24. The pins 26 limit the rotation of the end flange 20 upon the bearing surface 22 to the length of travel of the pins within the slots 25. The sealing ring 24 is also provided with slots 27 to receive cylindrical pins 28 which extend outwardly from the conduit 10. The pins 28 and slots 27 limit the longitudinal motion of the conduit 10 with respect to the housing 12.

Resilient O rings 29, are carried by the flange 20 in grooves between the spherical bearing surfaces 21, 22, on either side of the pins 26 to prevent fluid from leaving the flexible assembly at this point in the event of bellows failure. A similar set of O rings 30 are carried by the sealing ring 24 and extend between the sealing ring 24 and the conduit 10 on either side of the pins 28 in the conduit 10.

In this manner, a safety factor is built into the assembly in the event of bellows failure.

A flexible coupling assembly identical in construction to that hereinabove described within the enlarged housing 12 is disposed within the enlarged housing 14. The flexible coupling within the housing 14 connects the elbow shaped member 13 with the conduit 15 to complete the fluid line.

When pressure enters the flexible assembly, the metal bellows 19 is pressurized on its outer surfaces. This fluid pressure acts upon the elbow 13 in the directions of the two arrows $a$ and $b$. If boiler 11 and turbine 16 are fixed, the metal bellows will collapse as the pressure increases until the plates of the bellows nest. These nested plates are the equivalent in resisting compressive forces to a metal tube having diameters equal to the inside and outside diameters of the bellows and a strength equal to such a tube. As shown by the arrows, the greater the fluid pressure the greater are the compressive forces acting on bellows 19 and consequently bellows failure due to excessive pressure is minimized.

The permitted movements of a bellows will accommodate displacement of one end of the bellows with respect to the other end along the longitudinal horizontal or vertical axis, indicated as X, Y, and Z in FIGURE 1. By executing these movements, the bellows will accommodate rotation about two of the axis of the rectangular system of coordinates. However, a single bellows cannot accommodate rotation about the axis of the system of coordinates which is in line with the longitudinal axis of the bellows. In order to achieve such rotation it is necessary to introduce a second bellows into the assembly so that the pivotal movement of the second bellows on pins 28 will absorb the motion to the system imparted by the axial rotation of the first bellows.

In order to accomplish this result the second bellows must be disposed along an axis normal to that of the longitudinal axis of the first bellows as illustrated in FIGURE 1, so that a rotation of the conduit 10 about its axis will be transmitted through pins 28, ring 24, pins 26, and flange 20 to the housing 12, and then through elbow 13 to housing 14 which flexes the bellows in the housing 14. It will also be seen that axial rotation of the second bellows will be taken up by the permitted displacement of the first bellows in the assembly illustrated. The stresses developed in bellows 19 will be a minimum when the center of rotation lies at a point of the intersection of center line C, C′, with a plane that can be passed through the mating surfaces of the bellows 19 and the end flange 20 and contains the radius R which makes an angle of 90° with the center line C, C′, when the axis of the conduit 10 coincides with the axis of the elbow 13. The assembly will continue to function as the center point O moves out of this plane along the C, C′ axis but as the distance of the center of rotation O moves away from the plane A, B, the stresses in the bellows 19 will increase.

When the fluid pressures which are to be confined are low, the bellows assembly can be made of relatively thin material. If the distance between the two chambers is short the conduit may be supported at each end and no additional supporting elements such as hangars will be needed.

However, when the pressures are high and the distance between the chambers or elements which are interconnected is great, hangers must be used to support the conduit. In those instances where the relative movements of the boilers and turbines which are interconnected by the fluid line can be accommodated by a single bellows, conventional hangers may be used to support the structure.

When two bellows are required to accommodate rotation about the longitudinal axis of each bellows as shown in FIGURE 1, it is necessary to place in the conduit assembly one or more hangers which permit the conduit to rotate about these two axes. Such hangers under conditions of high pressure form a portion of the combination of the flexible assembly inasmuch as it is important that the bellows be permitted to execute their normal movements without having to support a heavy conduit and heavy conduit elements which are needed in the assembly. The hanger 31 which is secured to the elbow shaped member 13 in FIGURE 1, and hereinafter more fully described in connection with FIGURE 13, permits the said elbow to move and rotate in all directions while at the same time supporting the assembly.

The effect of a movement of the boiler 11 with respect to the turbine 16 is illustrated in FIGURE 3. When the conduit 10 is displaced with respect to the conduit 15 the sealing ring 24 is rotated upon the spherical bearing surface 21, of the end flange 20. The travel of the sealing ring 24 is limited by the distance which the pin 26 can move within the slot 25. The bellows 19 is compressed or expanded depending upon the direction of rotation and the bellows movement is kept within the operational limits of the bellows by the pins 26.

If the boiler 11 is forced longitudinally of the conduit 10 it will push the conduit 10 into the housing 12. The pins 28 will then slide within the slots 27 in the sealing ring 24 but only to the limit of travel within the said slots. The bellows 19 will thereupon be prevented from overextension.

Figure 4:
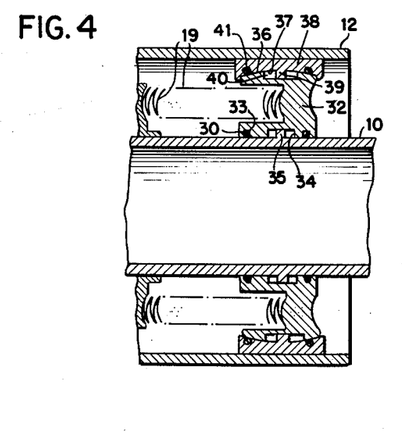
FIGURE 4 is a view in longitudinal section of a low pressure flexible coupling according to the present invention, constituting a second embodiment.

The embodiment shown in FIGURE 4 illustrates a flexible coupling for use in installations operating at fairly low pressures. In this form of the invention the bellows member 19 is secured to the sealing ring 32 which is slidably carried upon the conduit 10. O rings 30 are disposed within grooves 33 in the bottom of the sealing ring 32 and serve to prevent fluid leaking past the sealing ring 32 between the said ring and the conduit 10. The sealing ring 32 is provided with slots 34 into which there extend pins 35. The pins 35 limit the longitudinal motion of the conduit 10 with respect to the sealing ring 32. The top of the sealing ring 32 is provided with a spherical bearing surface 36 which rotates within a complimentary bearing surface 37 formed in a ring shaped end flange 38 which is welded to the inside of the housing 12. The flange 38 has a pin 39 extending therefrom and into a slot 40 cut in the top of the sealing ring 32. The conduit 10 can thus rotate upon the spherical bearing surfaces of the sealing ring 32 and flange 38 within the limits prescribed by the pin and slot construction.

Since the bellows 19 in this embodiment of the invention does not act as a seal to prevent the fluid from passing between the top of the sealing ring 32 and the flange 38, O rings 41 must be provided for this purpose between the two members. It will be apparent that the ability of O rings to withstand the fluid will depend upon the coupling being used only in installations where the fluid pressure is relatively low.

Figure 5:
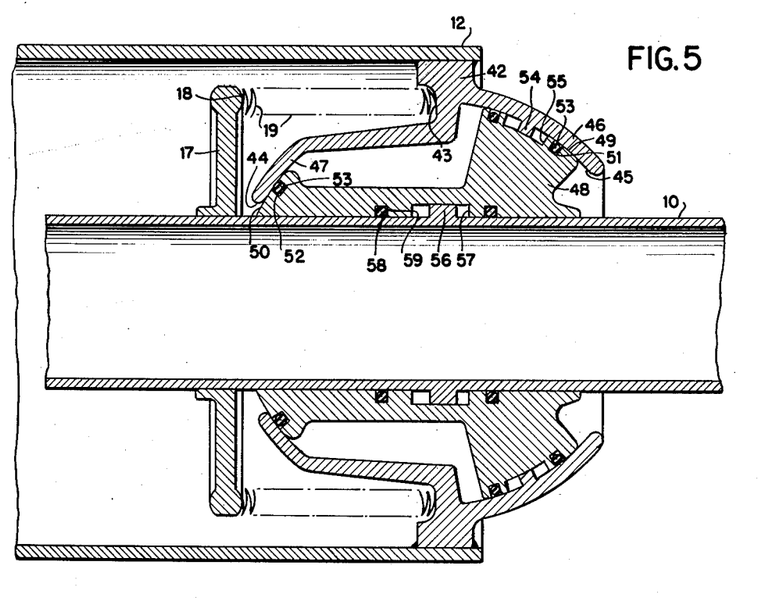
FIGURE 5 is a view in longitudinal section taken through a flexible coupling made in accordance with the present invention, constituting a third embodiment.

Referring to FIGURE 5 there is shown a further embodiment of the present invention in the form of a flexible coupling assembly incorporating an additional safety element which retains the fluid within the system in the event of bellows failure.

In this form of the invention the conduit 10 is led into the enlarged housing 12 and has an end flange 17 secured therearound. The upper portion of the end flange 17 is rounded at 18, to form a seat for the end of the metal bellows 19. It is contemplated to employ a nesting type bellows 19 in this form of the invention in the same manner and for the same reasons as have been hereinabove set forth in connection with FIGURE 1. One end of the bellows 19 is welded to the end flange 17 so as to overlie the seat 18 and the opposite end of the bellows 19 is secured to an end fitting 42. The end fitting 42 is welded to the inside surface of the enlarged housing 12 and extends inwardly thereof. A bellows plate seat 43 is provided on the inner surface of the end fitting 42 to support the nesting bellows when the bellows 19 is collapsed. The shape of the seat 43 conforms to the curvature of the bellows plate. The end fitting 42 is in the form of a housing open at each end as indicated at 44 and 45. The housing portion of the end fitting 42 has inwardly curving walls 46, 47, which form spherical sealing surfaces for a sealing member 48. The sealing member 48 is formed with spherical bearing surfaces 49, 50, at each end thereof. The bearing surfaces 49, 50 are grooved as indicated at 51 and 52 to receive O rings 53. The O rings 53 provide a fluid tight seal between the walls 46, 47, of the end fitting 42 and the bearing surfaces 49, 50, of the sealing member 48. The rotation of the conduit 10 upon the bearing surfaces of the end fitting 42 and the sealing member 48 is limited by the travel of the pins 54 within slots 55, which are cut into the sealing member 48. The pins 54 are carried by the wall 47 of the end fitting 42. Longitudinal motion of the conduit 10 is restricted by the travel of the pins 56 within slots 57 which are cut in the sealing member 48.

In the event of bellows failure, the fluid within the housing 12 will escape into the chamber formed between the bellows 19 and the wall 46 of the end fitting 42. The sealing O rings 52, and the rings 58, which are carried in grooves 59 on the inner surface of the sealing member 48 so as to bear against the conduit 10, prevent the fluid from escaping. However, should the fluid get past the O ring 52, it will enter the chamber formed between the interior of the housing of the end fitting 42 and the bearing surface 49 of the sealing member 48. The O rings 53 which are carried within grooves in the bearing surface 49 prevent the fluid from escaping at this point. It will thus be seen that a double safety seal has been built into this embodiment of the invention whereby fluid will not escape from the flexible element in the event of bellows failure.

When the conduit 10 is rotated about its longitudinal axis, the pins 56 and 54, will bear against the walls of the slots 55, and 57, so that the conduit and the enlarged housing 12 will turn as a unit. The torque is thereby prevented from reaching the bellows 19 within the housing 12 since rotary forces of this nature are not permitted bellows movements. The rotation of the conduit 10 is transmitted along the housing 12 through the elbow shaped member 13 to the second enlarged housing 14, (see FIGURE 1) within which it is translated into rectilinear motion and taken up by the bellows within the said housing.

Figure 6:
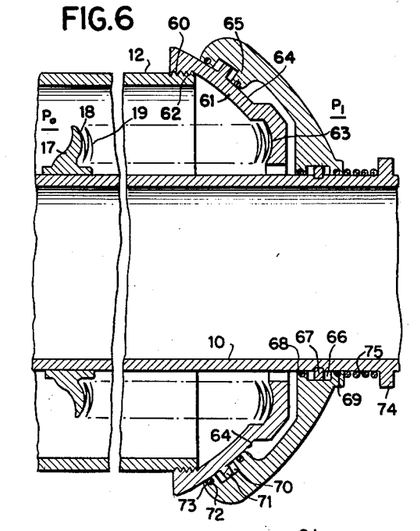
FIGURE 6 is still another embodiment of a flexible coupling for use in connection with fluid lines which must withstand axial displacement.

In FIGURE 6 there is shown a flexible coupling construction which is particularly suited for use on vacuum systems where the ambient pressure $P_1$ is greater then the internal pressure $P_0$. In this embodiment the conduit 10 extends within the enlarged portion of the housing 12 and has an end flange 17 welded thereto. The end flange 17 is provided with a bellows seating surface 18 to which there is welded the metal bellows 19. The end of the housing 12 is threaded as indicated at 60 to receive thereon an enlarged end flange member 61. The end flange 61 is internally threaded as indicated at 62 for fluid tight engagement with the housing 12. The end flange 61 is provided with a bellows supporting seat 63 to which the bellows 19 is welded.

The enlarged end flange 61 has a spherical outer surface 64 which serves as a bearing surface for the sealing ring 65. The sealing ring 65 is slidably carried upon the conduit 10 and is provided with longitudinal slots 66 to receive pins 67 carried by and extending outwardly from the conduit 10. Grooves 68 are cut into the sealing ring 65 on either side of the slot 66 to receive O rings 69. A seal is thus provided between the sealing ring 65 and the outer surface of the conduit 10. The opposite end of the sealing ring 65 is provided with slots 70 within which there is received pins 71 extending from the end flange 61. O rings 72 are carried within grooves 73 on either side of the slots 70 and ride upon the spherical outer surface 64 of the end flange 61 to form a seal between the end flange 61 and the sealing ring 65.

The conduit 10 is provided with an annular stop member 74 which extends outwardly thereof and forms a support for one end of a coil spring 75. The opposite end of the spring 75 bears against the sealing ring 65 and urges it against the spherical surface of the end flange 61 to maintain the fluid tight seal therebetween.

When the conduit 10 is axially displaced with respect to the housing 12, the sealing ring 65 slides upon the outer spherical surface of the end flange 61 within the limits imposed by the slots 70 and the pins 71. The bellows 90 is then extended and compressed in accordance with the motion of the conduit 10 and maintains a seal between the inside of the housing 12 and the outside of the system. If the conduit 10 is thrust into the housing 12 it will slide within the sealing ring 65 within the limits permitted by the slots 66 and the pin 67.

Since a failure of the bellows will allow the pressure $P_0$ within the housing to act on a large portion of the end flange 41 this assembly should be used on vacuum systems where the ambient pressure $P_1$ is greater then the internal pressure $P_0$.

Figure 7:
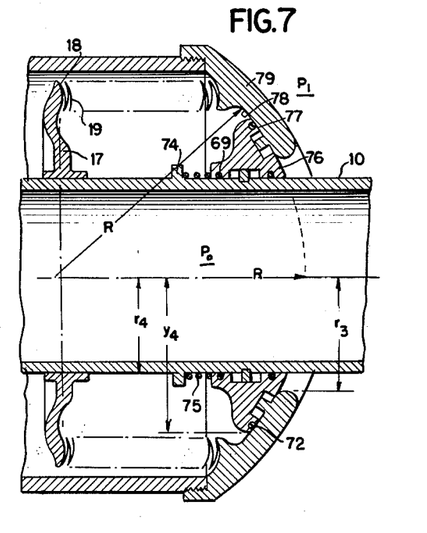
FIGURE 7 is a longitudinal section of a fluid coupling illustrating a fifth embodiment of the present invention.

The flexible coupling assembly shown in FIGURE 7 may be used where the internal pressures $P_0$ are much higher then the external pressure $P_1$. In this embodiment a failure of the bellows 19 will exert a force outwardly upon the sealing ring 76 of $\pi(Y^2_4-r^2_4)P_0$ which is always greater than the forces $\pi(r^2_3-r^2_4)\ P_1$, acting inwardly at a pressure $P_1$ plus $\pi(Y^2_4-r^2_3)\ P_0'$, even though it is assumed the pressure $P_0{\neq}P_0'$, were to act between the two mating surfaces 77, 78 on the sealing ring 76 and the end flange 79 respectively. Since the fluid escaping between the surfaces 77, 78 is flowing, it is known from Bernoulli's theorum that the effective pressure between the surfaces must always be less then $P_0$.

The construction of the coupling of FIGURE 7 differs from that shown in FIGURE 6 in that the sealing ring 76 is within the end flange 79. In addition, the spherical bearing surface 78 is on the inner surface of the end flange 79 and the stop member 74 on the conduit 10 is within the enlarged housing 12. O rings 69 are employed to form a seal within the sealing rings 76 and the conduit 10 and an O ring 72 is employed to form a seal between the sealing ring 76 and the end flange 79. The coil spring 75 urges the sealing ring 76 against the bearing surface 78 of the end flange 79. The metal bellows 19 forms a fluid tight flexible seal between the inside of the housing 12 and the outside of the fluid system. Rotational movements and longitudinal motion of the conduit 10 are restricted by means of pins and slots in the manner hereinabove described in connection with FIGURE 6.

Figure 8:
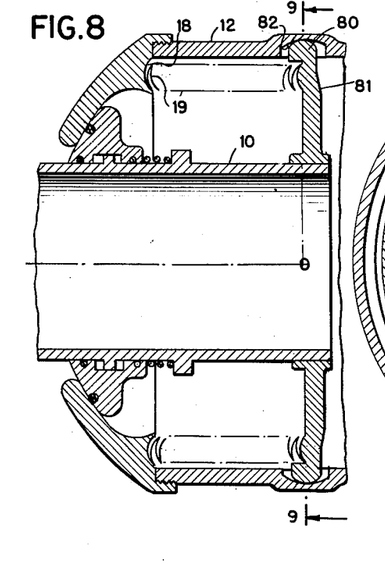
FIGURE 8 is a view in longitudinal section illustrating still another embodiment of the present invention.
Figure 9:
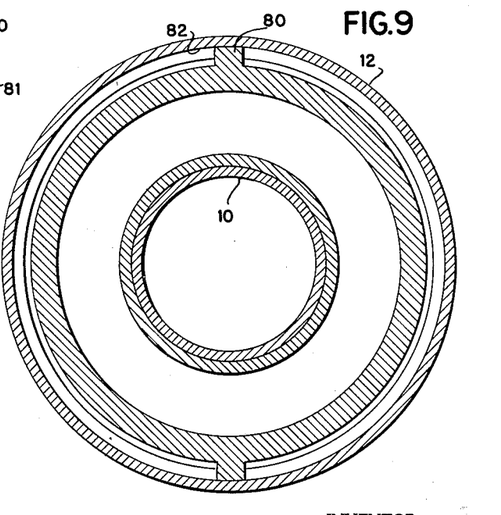
FIGURE 9 is a cross sectional view taken on line 9—9 of FIGURE 8, looking in the direction of the arrows.

The embodiment shown in FIGURE 8 is similar to that illustrated and described in connection with FIGURE 7 except that the angular displacement of the conduit 10 in FIGURE 8 is limited by the travel of the pins 80 provided on the end of the end flange 81 within slots 82, which are cut into the inner wall of the outer housing 12. This form of construction is more positive in action than the assemblies hereinabove referred to and is more simple to operate. As shown in FIGURE 9, the pins 80 extend into the housing 12 at the top and bottom thereof.

Figures 10, 11, 12:
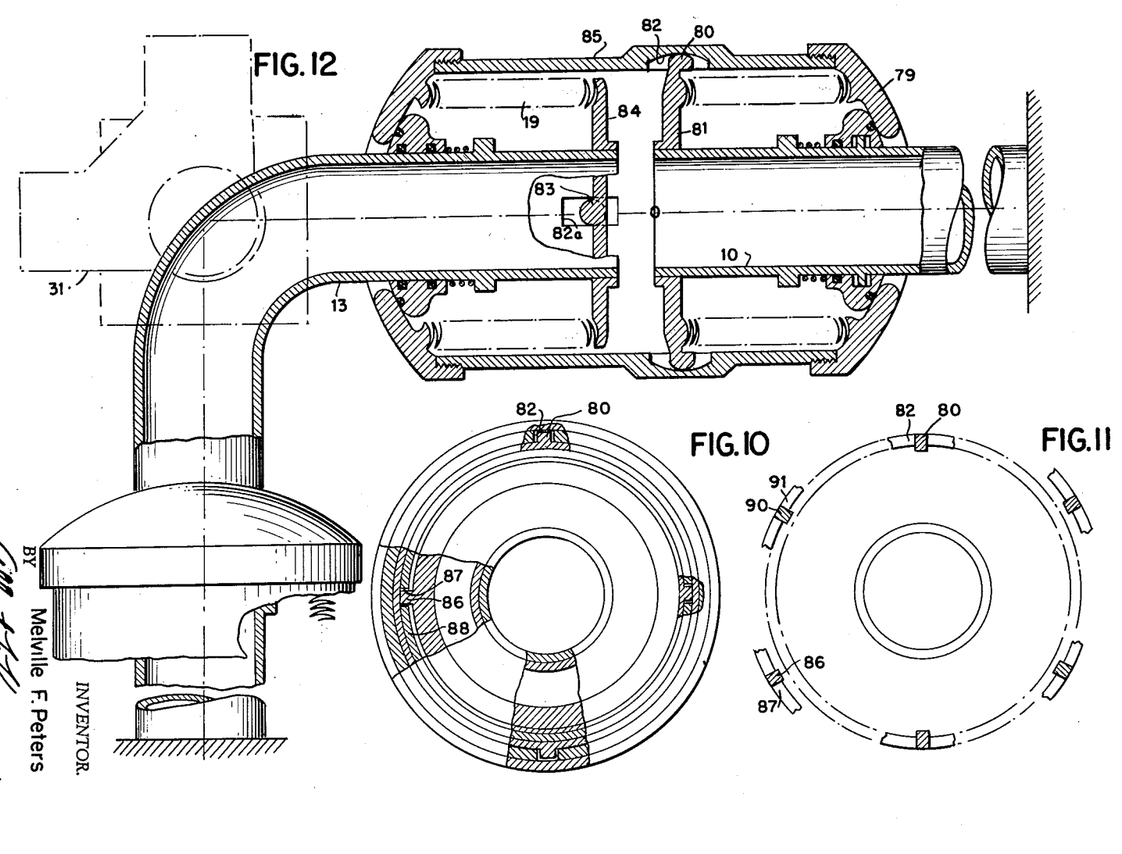
FIGURE 10, is a cross sectional view of a flexible coupling capable of rotating in two planes and constituting a seventh embodiment of the present invention.
FIGURE 11, is a cross sectional view of a flexible coupling capable of rotating in three planes constituting an eighth embodiment of the present invention.
FIGURE 12 is a view in longitudinal section showing a flexible assembly in which the flexible coupling portion incorporates two flexible bellows assemblies within a single housing.

The embodiment illustrated in FIGURE 1, satisfies the rectilinear and rotary motions along and about the three axes. In some installations it is often desirable to use two short assemblies similar to the flexible coupling shown in FIGURE 3 in the same housing, in the same manner as the two assemblies shown in FIGURE 12. In using assemblies in the assembly shown in FIGURE 12. In using assemblies with gimbels as shown in FIGURE 8, it is necessary to use more than one assembly to obtain rotations in more than one plane. When it is necessary to obtain rotations in two planes with the assembly shown in FIGURE 8, it is necessary to have the gimbels placed at right angles to each other, since the plane of rotation is always at right angles to the gimbels, whereas in FIGURE 12 the first plane of rotation is determined by a plane passing through the pins 81 on the end fitting 82 and the center point O about which the pins rotate. The second plane will pass through the pin 83 of the end flange 84 and the center of rotation of the said end flange 84 which plane is at right angles to the first described plane. In all other respects the construction of the flexible coupling members within the housing 85 corresponds to the construction shown in FIGURE 8. A second flexible coupling similar to that shown connected to the conduit 10 in FIGURE 12 is attached to the opposite end of the elbow shaped member 13 to enable the conduit 10 to be rotated about its longitudinal axis. A hanger member 31 may be employed in conjunction with this assembly for the same purposes as was hereinabove set forth in connection with FIGURE 1.

In FIGURE 10 there is shown a modified unit which permits a single flexible element to accommodate rotation in each of two planes at right angles to each other. The showing of FIGURE 10 is a cross-sectional view taken through the center of rotation of an assembly similar to the assemblies in FIGURES 8 and 9 except that the single pair of pins 80 and slots 82 shown in FIGURES 8 and 9, have been replaced by two pairs of pins 80 and 86, and two pairs of slots 82 and 87. The slots 87, are cut into a ring shaped member 88 and the pins of the end flanges are received therein. The pins 80 are received within slots 82 cut into the housing 89.

In general, by adding pairs of pins to rings which contain slots for supporting and receiving the pins or vice versa, it is possible to add to the rectilinear motion a plurality of rotations in planes passing through the longitudinal axis without subjecting the bellows 19 to shearing forces.

FIGURE 11 illustrates three pairs of pins 80, 86, and 90, which are received in slots 82, 87, 91 and in which the slots 87 and 91 are cut into rings 88 and 92 which are carried within the housing. This assembly will permit rotation in planes passing through the longitudinal axis which are 60° apart. In this manner, pins, slots and rings can be added to allow a plurality of movements with one bellows in the assembly.

The single assembly shown in FIGURE 10 could replace the two assemblies shown in the housing 85 of FIGURE 12. However, the two assemblies within the single housing have certain advantages when the rectilinear displacement is desired and the rotations are small, since each bellows need only be made one half as long as a single bellows to take care of thermal expansion of the piping system. The complete installation illustrated in FIGURE 12 can accommodate rectilinear motion in combination with rotation in four planes when the housing 85 and the housing 91 are arranged so that their longitudinal axis are 90° apart.

The elbow 13 in this embodiment extends within the housing 85 and is provided with an end flange 84. The elbow end of the housing 85 is closed by an end flange 79 and a bellows 19 connected between them. A pin 83 is disposed at right angles to the pin 80 of the end flange 81 and slides within slot 82A which limits the rectilinear movement of the elbow 13.

Figures 13, 13A, 14, 14A:
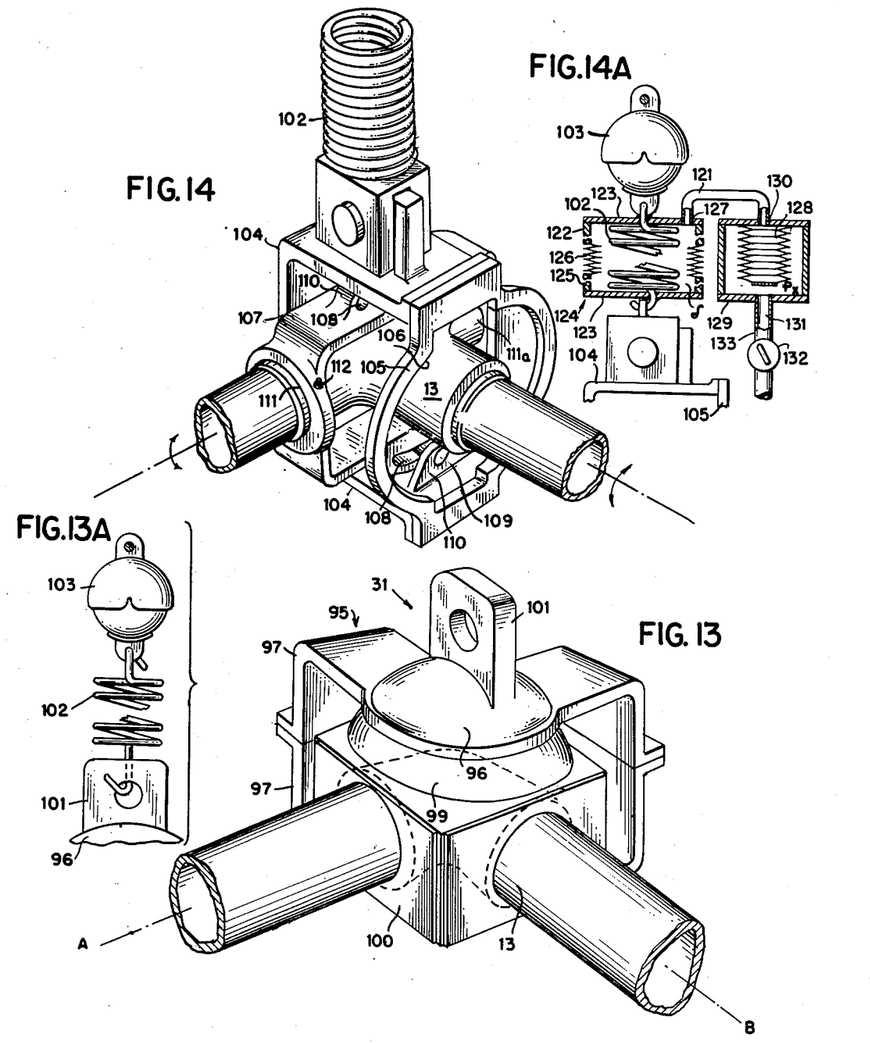
FIGURE 13 is a view in perspective of the hangar structure shown in FIGURE 1.
FIGURE 13A is a view in side elevation of a ball-joint swivel for the hangar spring of FIGURE 13.
FIGURE 14 is a view in perspective of a second form of hangar suitable for use in the present invention.
FIGURE 14A is a view in side elevation of a ball joint swivel for the hangar spring of FIGURE 14.

The hangar 31, shown in perspective in FIGURE 13, is important in the flexible assemblies herein described to support the said assemblies while at the same time permitting movement thereof in all of the directions of which they are capable. The hangars hold the structures in place and neutralize the gravitational forces without limiting the rectilinear and rotary motions of the assembly.

The hangar 31 consists of a frame 95 made up of top and bottom bracket portions 97 secured together at 98. The bracket portions 97 are somewhat L shaped, as shown in FIGURE 13, and are formed with a spherical socket member 96 where the arms of the L shape intersect. The socket members 96 are opposed to one another when the frame 95 is assembled and receive therebetween a spherical bearing member 99 which is carried upon a box-like housing 100. The housing 100 receives the elbow 13 of the flexible assembly therein. The disposition of the elbow 13 within the housing 100 is such that the longitudinal axes of the flexible assemblies indicated at A and B in FIGURE 13, intersect at the center of rotation of the spherical bearing member 99 within the socket members 96. It will be seen that the elbow member 13 will be free to move in any direction within the hangar 31.

The top of the hangar 31 is provided with a fitting 101 by means of which it may be secured to a supporting structure. In order to increase the mobility of the hangar 31, it is preferred to interpose a spring member 102 between the hangar 31 and the supporting structure. The spring member 102, shown in FIGURE 13A, will permit the hangar 31 to swing or twist in all directions for the purpose of accommodating itself to the motion of the flexible assembly. The top of the spring 102 may be secured to a ball joint member 103 to further increase the freedom of motion of the entire structure. The ball joint 103 in turn may be fastened to the supporting structure for the hangar.

In FIGURE 14 there is shown another form of hangar in which the elbow 13 is carried by a gimbel arrangement. The hangar in FIGURE 14 consists of a frame 104 having a somewhat C shaped cross-section. The open end of the C shape is provided with a plate 105 having an opening 106 therein through which the elbow 13 passes. A somewhat O shaped bracket 107 is carried within the frame 104, and is provided with arcuately slotted portions 108 at the top and bottom thereof. The slotted portions 108 receive pins 109 which are carried by ears 110 extending inwardly from the top and bottom of the frame 104. The bracket 107 is thus able to rock up and down through a limited arc within the frame 104 and also from side to side upon the pins 109, which are loosely fitted within the slotted portions 108. The bracket 107 is provided with a bore 111 to permit the elbow 13 to pass therethrough. The bore 111 acts as a bearing surface within which the elbow may rotate. A further bearing 111A may be provided in the bracket 107 to support the elbow which may have a T shaped configuration for this purpose. Lubrication for the assembly may be provided at the bearing points by means of a fitting 112. It will be seen that the flexible assemblies will be able to move in all directions within the hangar by reason of the construction thereof.

In FIGURE 14A there is shown a spring and ball joint assembly similar to that illustrated in FIGURE 13A but having applied thereto a damping construction by means of which it is possible to control resonant vibration which takes place when the applied frequency of the vibration reaching the hanger is equal to the natural frequency of the spring mass assembly. Unlike conventional methods of damping which attach the damping unit to the mass, the construction in FIGURE 14A applies the damper in the spring assembly supporting the flexible assembly.

Damping, in the embodiment shown in FIGURE 14A, is achieved by changing the effective mass of the liquid $\delta$ in the tube 121 and using the viscosity of the liquid $\delta$ to serve as a damper for the spring 102. With this arrangement it is possible to do two things; (1) Change the natural frequency of the assembly by changing the effective mass and (2) to dampen the vibration of the spring mass assembly by damping the spring 102. A fluid receiving reservoir 124 is secured around the spring 102 by attaching end plates 123 at each end of the spring as shown in FIGURE 14A. The small reservoir 124 consists of side walls 125, which are welded at each end to the end plates 123, and a bellows member 126 which is incorporated within the side walls 125. One of the end plates 123 is provided with an opening 127 to which the tube 121 is attached. The other end of the tube 121 is in communication with the interior of a bellows member 128 which is closed at one end and secured at its open end to the wall of a pressure chamber 129 around the tube-receiving opening 130, therein. A second opening 131 is provided in the wall of the chamber 129 for the purpose of receiving a controlling pressure which is applied within the chamber 129 and around the outside surface of the bellows 128. A pressure indicated at $P_x$ is established within the chamber 129 through the valve 132 in the pressure inlet line 133.

As the spring 102 vibrates, the fluid which is within the reservoir 123 and fills the tube 121 and the interior of the bellows 128, and which may have a high viscosity, will be forced to circulate between the reservoir 124 and the bellows 128 through the tube 121. The circulation of the fluid in the system will require the expenditure of energy, which will increase as the length of the tube 121 is increased and as its cross-sectional area is decreased. In this manner resonance vibration can be eliminated from the assembly.

When the operating temperatures of the system do not exceed a few hundred degrees Fahrenheit, it is often advantageous to make parts or all of the bellows assembly from plastics such as polyethylene, Teflon, or the like. When the operating pressures are relatively low and the operating temperature range is between —80° and 350° F., elastomers can be used in combination with metals and plastics to form the bellows. The combination of metal discs bonded together at their mating surfaces at either their inner or outer diameters to form bellows, is hereinafter referred to as a "bellmets." When the bellmets is internally pressurized, the inner diameters of the bellows plates are bonded together with elastomers and the outer diameters of the plates are welded together in the conventional manner. When the bellmets is externally pressurized, the outer diameters of the bellows are bonded together with elastomers and the mating surfaces of the inner diameters are welded together. Since a bellmets permits of a rotation about its axis, in addition to permitting all of the movements of a conventional bellows, the flexible assemblies hereinabove described can be simplified in a manner shown in FIGURE 15.

Figure 15:
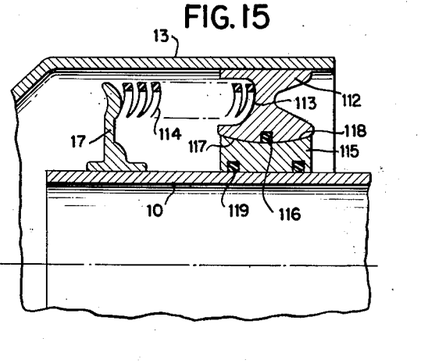
FIGURE 15 is a cross sectional view of a flexible coupling in which bellows having the ability to withstand rotation are employed.

Referring to FIGURE 15 it will be seen that the housing 13 has secured thereto an end flange 112, having a bellows receiving seat 113 on the inner face thereof. The bellows 114 is a bellmets and is bonded together on its outer peripheries with an elastomer. This type of bellmets is suitable for an externally pressurized application as is the case within the housing 13. The inner end of the bellmets 114 is secured to a flange 17, and the shape of the flange 17 adjacent to the bellows 114 is such that the bellmets 114 will nest under conditions of excessive pressure. Since the bellmets 114 will permit of rotation, the pin and slot construction hereinabove referred to is not required in this form of the invention. A seal is effected between the sealing ring 115 and the end flange 112 by means of O rings 116 which are carried between the spherical bearing surfaces 117, 118 of the end flange and sealing ring and also by means of the O rings 119, which are disposed between the conduit 10 and the sealing ring 115.

As relatively high pressures the two bellows assemblies, used in the embodiment, shown in FIGURE 12, may be of equal size. However, at low pressures it may be necessary to construct this form of the invention using bellows assemblies of dissimilar size to prevent hammer and vibration within the system.

Having thus fully described the invention what is claimed as new and desired to be secured by Letters Patent of the United States, is:

1. A flexible coupling assembly for interconnecting spaced fluid bearing conduits comprising, a first enlarged housing, a second enlarged housing disposed normal with respect to the first housing, a first conduit concentrically disposed in the first housing, a second conduit concentrically disposed in the second housing, an elbow connecting the housings for fluid flow therethrough, a first end flange on each of the conduits within the housings, a second end flange on each of the housings extending radially inwardly thereof, a bellows assembly within each of the housings connected to one end of the conduit end flange and at its opposite end to the housing end flange to form a fluid tight flexible seal between each of the conduits and its housing, diametrically opposed means associated with said first conduit and housing restraining all motion of the first conduit with respect to its housing to movement of the conduit along its axis in a plane including said means and to oscillation in said plane, and means restraining movement of said second conduit with respect to its housing in the same direction as the first conduit but in a plane disposed at right angles to said first plane.

2. A flexible coupling assembly as set forth in claim 1 wherein the bellows assembly is of the nesting type.

3. A flexible coupling assembly as set forth in claim 1 wherein the means includes diametrically opposed pins on each conduit, a ring surrounding each conduit having means therein receiving the pins, sealing means carried by each ring and engaging the surface of each conduit.

4. A flexible coupling assembly as set forth in claim 3 wherein the housing end flanges have diametrically opposed slots therein receiving the laterally extending pins on the conduits.

5. A flexible coupling assembly as set forth in claim 1 wherein said bellows at each end having a substantial radial extent and being fused to the flange at the free end of the bellows, the flange adjacent the point of fusing having a surface shaped complementary to the end of the bellows providing a bearing surface.

6. A flexible coupling assembly as set forth in claim 1 wherein the means includes diametrically opposed pins on each conduit disposed on the first conduit normal with respect to the second conduit, an intermediate ring around each conduit having diametrically opposed slots therein receiving the pins, the end flanges on the housings having a surface on the inwardly extending portion, the ring having a complementary surface on the face opposite to the conduit engaging face, one of the surfaces having diametrically opposed pins thereon with the other surface having diametrically opposed slots therein receiving the last named pins.

7. A flexible coupling assembly as set forth in claim 6 wherein the opposed slots in the first housing are disposed in a plane normal to the slots in the second housing.

8. A flexible coupling assembly as set forth in claim 1 wherein the elbow is so supported and carried by a hanger that the elbow has universal motion therein.

9. A flexible coupling assembly as set forth in claim 1 wherein a circular ring surrounds each conduit, each ring carrying sealing means therein engaging the circumference of each conduit, each ring having a lateral spherical surface opposite to each conduit engaging surface and each of the housing end flanges having a complementary spherical surface thereon.

10. A flexible coupling assembly as set forth in claim 1 wherein the elbow comprises a third conduit extending into each housing, each end of the elbow having an end flange thereon, each housing having a second inwardly extending end flange thereon, and a second bellows assembly within each housing connected at one end to each of the elbow flanges and at the other end to each of the second flanges within the housings to form flexible seal between the elbow and housing adjacent thereto.

References Cited in the file of this patent

UNITED STATES PATENTS

| | | |
|---|---|---|
| 275,776 | Kruesi | Apr. 10, 1883 |
| 330,134 | Lerede | Nov. 10, 1885 |
| 912,923 | Vauclain | Feb. 16, 1909 |
| 1,351,875 | Schreiber | Sept. 7, 1920 |
| 1,603,579 | Budwell | Oct. 19, 1926 |
| 2,018,613 | Hall | Oct. 22, 1935 |
| 2,305,809 | Maisch | Dec. 22, 1942 |
| 2,451,252 | Stoeckly | Oct. 12, 1948 |
| 2,564,938 | Warren | Aug. 21, 1951 |
| 2,590,392 | Feilden | Mar. 25, 1952 |
| 2,623,763 | Fauser | Dec. 30, 1952 |
| 2,925,829 | Thompson | Feb. 23, 1960 |

FOREIGN PATENTS

| | | |
|---|---|---|
| 722,241 | England | Jan. 19, 1955 |
| 566,092 | Belgium | Mar. 18, 1958 |